INVENTOR
ROBERT MEES
BY
Toulmin & Toulmin
ATTORNEYS

United States Patent Office 3,083,613
Patented Apr. 2, 1963

3,083,613
FILM GUIDE MEANS IN CINEMATOGRAPHIC PROJECTORS
Robert Mees, Wissmar, Germany, assignor to Ernst Leitz Gesellschaft mit beschränkter Haftung, Wetzlar (Lahn), Germany
Filed Oct. 5, 1960, Ser. No. 60,644
Claims priority, application Germany Oct. 8, 1959
5 Claims. (Cl. 88—17)

The present invention relates to projectors. More in particular, the invention relates to cinematographic projectors with automatic threading of the film strip, and more particularly still to film guide means in such projectors.

It is an object of the present invention to provide film guide means in a cinematographic projector enabling an automatic threading of the film strip.

It is another object of the present invention to provide film guide means in a cinematographic projector which assure a firm grip of a conveying sprocket wheel of the accurately adjusted film strip.

It is a further object of the present invention to provide film guide means in a cinematographic projector which prevent movement of the film beyond a sprocket wheel in case the film strip is in a badly adjusted position wherein the teeth of the sprocket wheel do not coincide with the perforations in the film strip.

It is still another object of the present invention to provide film guide means in a cinematographic projector which prevent a threading of the film into the projector in a side-inverted position.

These objects are achieved by the guide means of the present invention, according to which two guide portions circumscribe part of the periphery of a film conveying sprocket wheel onto which latter the film is introduced. These portions define with the adjacent surface of the sprocket wheel a wedge-shaped gap narrowing in the direction of travel of the film strip and having a groove receiving the teeth of the sprocket wheel. The portions on one or on both sides of the grooves approach closely the peripheral surface of the sprocket wheel. Due to this arrangement an introduced film strip which has been gripped in its perforations by the teeth of the sprocket wheel is urged against the peripheral surface of the sprocket wheel, but a film strip arriving in such a manner, that the perforations do not coincide with the teeth of the sprocket wheel, e.g. in side-inverted position, is prevented from being moved by the teeth of the sprocket wheel.

The two guide portions may be constructed as one piece of material. Preferably, however, they consist of two separate pieces, a leading portion and the trailing portion, the latter being disposed after the first one in the direction of travel of the film strip. This makes it possible to provide the leading portion in fixed arrangement, whereas the trailing portion can be pivoted away from the film strip as is desirable whenever the latter portion is extended to form a loop setter for the film strip.

Preferably also, the two portions, or the leading portion, respectively, are extended to form diverging surfaces in the direction from which a film strip is introduced onto the sprocket wheel.

The invention will be further described with reference to the drawings, wherein

Figure 1:
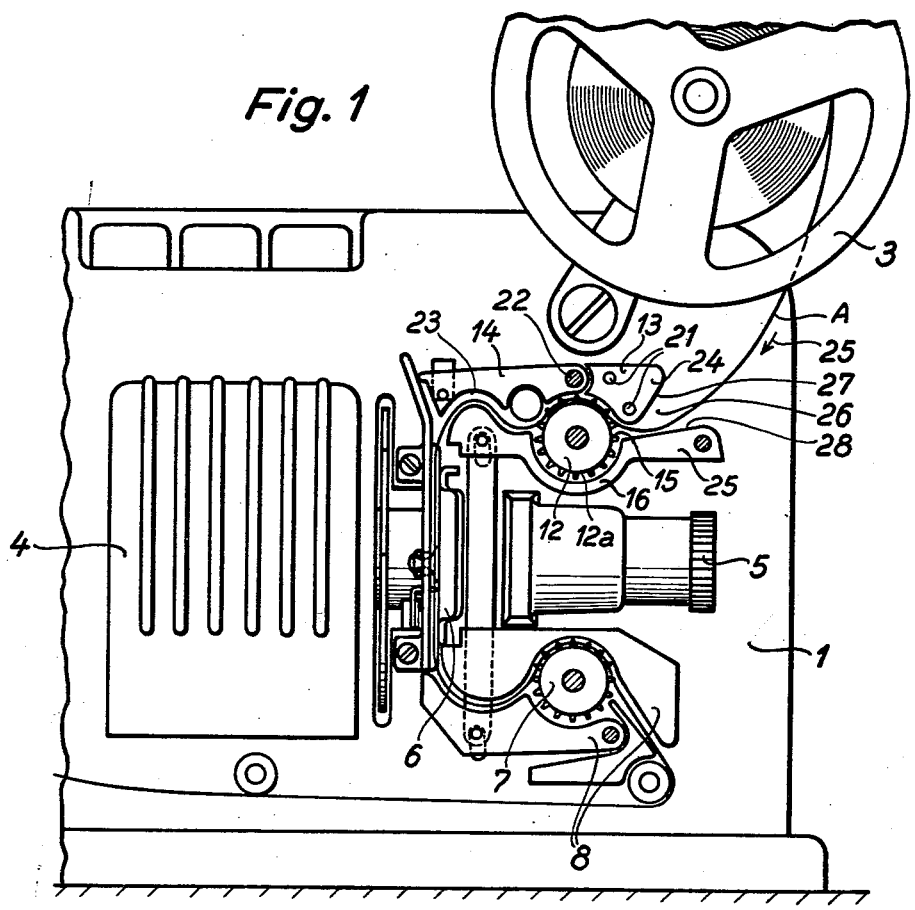
FIGURE 1 is a side elevational view of a projector with the film guide means according to the invention.

Referring now to the drawings more in detail, FIGURE 1 shows a projector having a casing 1 with a pay-out spool 3, a lamp casing 4 and an objective 5 and, between the lamp casing and the objective a plate 6 with the image aperture, not shown. FIGURE 1 furthermore shows a lower sprocket wheel 7 with guide means 8 disposed thereabout. An upper sprocket wheel with which are associated the guide means of the invention is designated with 12. The sprocket wheel has a peripheral surface 12a above which there project teeth 15. The guide means according to the invention comprise a first portion 13 and a second portion 14 which circumscribe part of the periphery of the sprocket wheel, e.g. a segment of 120°, the remaining, lower portion being substantially circumscribed by a lower guide member 16. Guide member 13, 14 forms with the peripheral surface 12a of sprocket wheel 12 a wedge-shaped slightly curved gap 18 (see FIGURE 2) which becomes narrower in the direction of travel of film strip A coming from pay-out spool 3.

The guide portion 13 is provided with a groove 13b into which the teeth 15 of sprocket wheel 12 are allowed to project, thereby enabling unimpeded rotation of the sprocket wheel. One side or both sides adjoining the groove 13b, however, approach closely and, in the direction of travel of the film strip A, to an increasing degree, the peripheral surface 12a of the sprocket wheel 12, as at 19.

Figure 2:
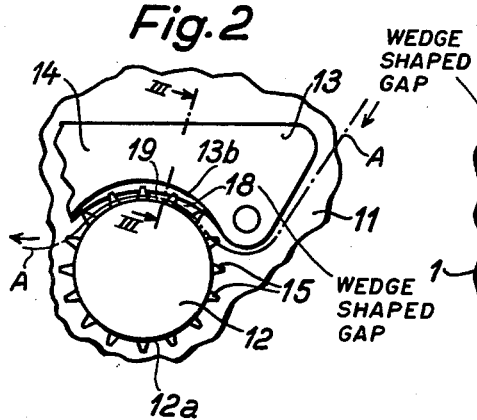
FIGURE 2 is a front view illustrating a sprocket wheel with the guide portions according to the invention, constructed of one piece of material.
Figure 3:
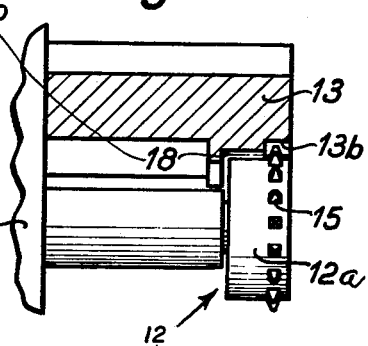
FIGURE 3 is a sectional view taken along lines III—III in FIGURE 2.

The guide portions 13 and 14 may consist of one piece of material, as shown in FIGURE 2. Preferably, however, they are separate as illustrated in FIGURE 1, wherein the first portion 13 which may be designated as the leading portion in the direction of travel of film strip A indicated by the arrow 20, is fixedly connected to casing 1 as at 21, whereas the second portion 14, which may be designated as the trailing portion is pivotably positioned as at 22, which is desirable if the portion 14 has an extension 23 forming a loop setter for film strip A.

It is furthermore highly advantageous to provide the guide portion 13 as well as the lower guide member 16 with extensions 24 and 25, respectively, so as to have diverging surfaces 27, 28, in the direction from which film strip A is received, defining an opening 26 through which film strip A is introduced onto sprocket wheel 12.

The film strip A supplied by pay-out spool 3 enters the opening 26, and is first slightly gripped by the uppermost points of teeth 15. The film is then pulled into the narrowing gap 18. As the gap becomes narrower, and as the portions adjoining groove 13b closely approach the peripheral surface 12a, the teeth 15 gradually project more and more through the perforations so that the film is firmly gripped and safely moved. If, however, the film arrives in a maladjusted position, in which the teeth 15 do not coincide with the perforations of the film strip, for instance, in case the film is erroneously threaded in side-inverted position, the film may be moved from the opening 26 a short stretch with the teeth 15 friction-contacting the non-perforated film surface; but by virtue of the narrowing gap 18 a further movement of the film strip is prevented.

It will be understood that this invention is susceptible to modification in order to adapt it to different usages and conditions, and accordingly, it is desired to comprehend such modifications within this invention as may fall within the scope of the appended claims.

What I claim is:

1. In a motion picture projector particularly adapted for films perforated along a single edge, a film-conveying sprocket wheel onto which a film strip, perforated along a single edge only, is introduced, said sprocket wheel having a plurality of radially projecting teeth on the periphery thereof, guide means for the film strip circumscribing a portion of the periphery of said sprocket wheel, guide means defining with the adjacent peripheral surface of said sprocket wheel a wedge-shaped gap narrowing in the direction of travel of the film strip and having a groove receiving the teeth of said sprocket wheel, said guide means on one side of said groove approaching closely the peripheral surface of said sprocket wheel below the outer ends of said radially projecting teeth thereon so that an introduced film strip having been gripped by said teeth in its perforations is urged against the peripheral surface of said sprocket wheel, but a film strip arriving in such a manner that its perforations do not coincide with said teeth is prevented from being moved by said teeth of said sprocket wheel.

2. In a motion picture projector particularly adapted for films perforated along a single edge, a film-conveying sprocket wheel onto which a film strip, perforated along a single edge only, is introduced, said sprocket wheel having a plurality of radially projecting teeth on the periphery thereof, guide means for the film strip having a first portion circumscribing a portion of the periphery of said sprocket wheel, and a second portion circumscribing another portion of the periphery of said sprocket wheel, a third guide portion circumscribing a further portion of the periphery of said sprocket wheel, said third guide portion and said second portion being extended to form diverging surfaces in the direction from which a film strip is introduced to said sprocket wheel, said first portion of said guide means defining with the adjacent peripheral surface of said sprocket wheel a wedge-shaped gap narrowing in the direction of travel of the film strip and having a groove receiving the teeth of said sprocket wheel, said first portion on one side of said groove approaching closely the peripheral surface of said sprocket wheel below the outer ends of said radially projecting teeth thereon so that an introduced film strip having been gripped by said teeth in its perforations is urged against the peripheral surface of said sprocket wheel, but a film strip arriving in such a manner that its perforations do not coincide with said teeth is prevented from being moved by said teeth of said sprocket wheel.

3. In a motion picture projector particularly adapted for films perforated along a single edge, a film-conveying sprocket wheel onto which a film strip, perforated along a single edge only, is introduced, said sprocket wheel having a plurality of radially projecting teeth on the periphery thereof, guide means for the film strip having a first portion circumscribing a portion of the periphery of said sprocket wheel, and a second portion circumscribing another portion of the periphery of said sprocket wheel, said first portion of said guide means defining with the adjacent peripheral surface of said sprocket wheel a wedge-shaped gap narrowing in the direction of travel of the film strip and having a groove receiving the teeth of said sprocket wheel, said first portion on both sides of said groove approaching closely the peripheral surface of said sprocket wheel below the outer ends of said radially projecting teeth thereon so that an introduced film strip having been gripped by said teeth in its perforations is urged against the peripheral surface of said sprocket wheel, but a film strip arriving in such a manner that its perforations do not coincide with said teeth is prevented from being moved by said teeth of said sprocket wheel.

4. In a motion picture projector particularly adapted for films perforated along a single edge, a film-conveying sprocket wheel onto which a film strip, perforated along a single edge only, is introduced, said sprocket wheel having a plurality of radially projecting teeth on the periphery thereof, guide means for the film strip having a first stationary leading portion circumscribing a portion of the periphery of said sprocket wheel, and a second pivotable trailing portion circumscribing another portion of the periphery of said sprocket wheel, said first portion of said guide means defining with the adjacent peripheral surface of said sprocket wheel a wedge-shaped gap narrowing in the direction of travel of the film strip and having a groove receiving the teeth of said sprocket wheel, said first portion on one side of said groove approaching closely the peripheral surface of said sprocket wheel below the outer ends of said radially projecting teeth thereon so that an introduced film strip having been gripped by said teeth in its perforations is urged against the peripheral surface of said sprocket wheel, but a film strip arriving in such a manner that its perforations do not coincide with said teeth is prevented from being moved by said teeth of said sprocket wheel.

5. In a motion picture projector particularly adapted for films perforated along a single edge, a film-conveying sprocket wheel onto which a film strip, perforated along a single edge only is introduced, said sprocket wheel having a plurality of radially projecting teeth on the periphery thereof, guide means for the film strip having a first stationary leading portion circumscribing a portion of the periphery of said sprocket wheel, and a second pivotable trailing portion circumscribing another portion of the periphery of said sprocket wheel, a third guide portion circumscribing a further portion of the periphery of said sprocket wheel, said third guide portion and said second portion being extended to form diverging surfaces in the direction from which a film strip is introduced to said sprocket wheel, said first portion of said guide means defining with the adjacent peripheral surface of said sprocket wheel a wedge-shaped gap narrowing in the direction of travel of the film strip and having a groove receiving the teeth of said sprocket wheel, said first portion on both sides of said groove approaching closely the peripheral surface of said sprocket wheel below the outer ends of said radially projecting teeth thereon so that an introduced film strip having been gripped by said teeth in its perforations is urged against the peripheral surface of said sprocket wheel, but a film strip arriving in such a manner that its perforations do not coincide with said teeth is prevented from being moved by said teeth of said sprocket wheel.

References Cited in the file of this patent
UNITED STATES PATENTS

| | | |
|---|---|---|
| 2,023,065 | Conrad et al. | Dec. 3, 1935 |
| 2,142,493 | Carpenter | Jan. 3, 1939 |
| 3,029,686 | Bernzott | Apr. 17, 1962 |